United States Patent [19]

Baker et al.

[11] 4,353,924

[45] Oct. 12, 1982

[54] ANIMAL FEED SUPPLEMENT HAVING REDUCED CORROSION CHARACTERISTICS

[75] Inventors: Joseph W. Baker, St. Louis, Mo.; Dennis L. Mansfield, Nitro, W. Va.; David J. Weinkauff, Manchester, Mo.

[73] Assignee: Monsanto Company, St. Louis, Mo.

[21] Appl. No.: 72,541

[22] Filed: Sep. 4, 1979

[51] Int. Cl.$^3$ .............................................. A61K 31/19
[52] U.S. Cl. ................................................... 424/317
[58] Field of Search ......................................... 424/317

[56] References Cited

U.S. PATENT DOCUMENTS 2,745,745  5/1956  Blake et al. .................... 424/316
3,773,927  11/1973  Cummins ..................... 424/317 X

OTHER PUBLICATIONS

*Poultry Science*, vol. 55 (3), pp. 1099-1103, 1976, Romoser et al.

*Primary Examiner*—Frederick E. Waddell
*Attorney, Agent, or Firm*—R. E. Wexler; H. C. Stanley

[57] ABSTRACT

An improved animal feed supplement having reduced corrosion characteristics is obtained by forming an aqueous solution containing 87–90 percent by weight 2-hydroxy-4-(methylthio)-butanoic acid and partially neutralizing the solution to a pH of 0.9–1.2.

5 Claims, No Drawings

ANIMAL FEED SUPPLEMENT HAVING REDUCED CORROSION CHARACTERISTICS

BACKGROUND OF THE INVENTION

This invention relates to an improved animal feed supplement having reduced metal corrosion characteristics comprising an aqueous solution containing from 87-90 percent by weight 2-hydroxy-4-(methylthio)-butanoic acid, i.e. MHA ® acid, and to the method for preparing same.

MHA is a registered trademark of Monsanto Company for 2-hydroxy-4-(methylthio)-butanoic acid.

The method for preparing MHA acid and its utility as an animal feed supplement are well known and set forth in commonly assigned U.S. Pat. No. 2,745,745 which is incorporated herein by reference. Such patent describes the preparation of MHA acid by hydrolysis of the corresponding cyanohydrin. Thus, the MHA-nitrile is hydrolyzed in excess aqueous mineral acid, such as hydrochloric acid or sulfuric acid, to afford the MHA acid and, e.g., ammonium chloride in a dilute aqueous hydrochloric acid slurry. The slurry is then dehydrated to remove water and aid in the precipitation of most of the ammonium chloride. During this process, most of the hydrochloric acid is also removed. The resulting thick slurry is then filtered and centrifuged to separate a further amount of ammonium chloride and then water is added back to dilute the mixture to a concentration of 87-90 percent by weight of MHA acid.

The acid solution thus prepared is suitable as an animal feed supplement but has presented problems in storage, transportation and handling in metal equipment because of its corrosion characteristics. Accordingly, the object of the present invention is to provide an aqueous MHA acid solution containing from 87 to 90 percent by weight MHA acid which shows reduced corrosion characteristics in contact with metal surfaces such as carbon steel, stainless steel and aluminum, such metals being used as materials of construction in storage, transportation and handling facilities.

SUMMARY OF THE INVENTION

In accordance with the present invention, it has been found that the MHA acid as prepared above, contains from about 0.3 to about 0.5% residual mineral acid from the hydrolysis step. This residual mineral acid presents corrosion problems relating to storage, transportation, handling and safety.

It has now been found that if the aqueous MHA acid solution is partially neutralized to the point where the residual mineral acid is neutralized but the MHA acid is not neutralized, an aqueous MHA acid solution is formed having reduced corrosion characteristics. Thus, if the MHA acid solution is neutralized to a pH of from about 0.9 to about 1.2, the residual mineral acid is neutralized and the aqueous acid solution may then be stored or transported and handled in contact with metal surfaces which could not be used with the non-neutralized material. It is critical, however, that the partial neutralization be very carefully done in order that only the residual mineral acid is neutralized and that no neutralization of the MHA acid occurs.

There are three stages in the process for preparing MHA acid wherein the excess mineral acid may be neutralized. Thus, the excess mineral acid may be neutralized (1) after hydrolysis and before dehydration, (2) after dehydration and before centrifuging and (3) after centrifuging when the concentrated MHA acid has been diluted to 87 to 90 percent by weight.

An 87 to 90 percent aqueous solution of MHA acid neutralized to a pH of from about 0.9 to about 1.2 contains essentially no free mineral acid and retains physical characteristics which are comparable to those of the non-neutralized material.

The neutralizing agents which may be used in the process of this invention include ammonia, ammonium hydroxide, sodium hydroxide, potassium hydroxide and calcium hydroxide.

EXAMPLE 1

To compare the corrosion rates of neutralized aqueous solutions of MHA acid containing 88 percent by weight MHA acid and non-neutralized aqueous solutions containing 88 percent by weight MHA acid, various metal surfaces were exposed to both the vapor and liquid state of the neutralized and the non-neutralized aqueous solutions at 40° C. The test duration was 40 days.

The results of the tests are set forth in Tables 1 and 2 below. It is readily seen that the neutralized material had significantly reduced corrosion characteristics as compared to the non-neutralized aqueous material.

TABLE 1

| Neutralized MHA (88% Assay) | | | |
| --- | --- | --- | --- |
| Example No. | Substrate | Exposure Medium | Corrosion Rate Mils/Year |
| 1 | Carbon Steel | Vapor | 2 |
|   |   | Liquid | 5 |
| 2 | Type 304 Stainless Steel | Vapor | 2 |
|   |   | Liquid | 2 |
| 3 | Type 316 Stainless Steel | Vapor | 1 |
|   |   | Liquid | 1 |
| 4 | Aluminum 3003 | Vapor | 1 |
|   |   | Liquid | 7 |

TABLE 2

| Non-Neutralized MHA (88% Assay) | | | |
| --- | --- | --- | --- |
| Example No. | Substrate | Exposure Medium | Corrosion Rate Mils/Year |
| 1' | Carbon Steel | Vapor | 2 |
|   |   | Liquid | 8 |
| 2' | Type 304 Stainless Steel | Vapor | 5 |
|   |   | Liquid | 3 |
| 3' | Type 316 Stainless Steel | Vapor | 3 |
|   |   | Liquid | 1 |
| 4' | Aluminum 3003 | Vapor | 4 |
|   |   | Liquid | 7 |

We claim:

1. An animal feed supplement having reduced metal corrosion characteristics comprising an aqueous solution containing 87-90 percent by weight 2-hydroxy-4-(methylthio)-butanoic acid, said solution having a pH of 0.9-1.2.

2. Supplement of claim 1 wherein said solution contains 88 percent by weight of said acid and said solution has a pH of 0.9.

3. An animal feed supplement comprising a solution consisting essentially of water and 88 percent by weight 2-hydroxy-4-(methylthio)-butanoic acid, said solution having a pH of about 0.9.

4. In an animal feed composition comprising an animal feed and an aqueous solution of 87–90 percent by weight 2-hydroxy-4-(methylthio)-butanoic acid, the improvement wherein the pH of said solution is adjusted to between about 0.9 and about 1.2.

5. Method of preparing an aqueous solution containing 87–90 percent by weight 2-hydroxy-4-(methylthio)-butanoic acid comprising hydrolyzing MHA-nitrile in excess mineral acid to afford a dilute aqueous slurry of mineral acid, MHA acid and the salt of the mineral acid, dehydrating said slurry to remove water and mineral acid and precipitate the salt of the mineral acid, filtering and centrifuging the remaining slurry to separate the mineral acid salt, adding water to the slurry to afford an aqueous solution of 87–90 percent by weight MHA acid and 0.3 to 0.5 percent residual mineral acid and thereafter adjusting the pH of said solution to pH 0.9–1.2 whereby the residual mineral acid is neutralized without neutralizing the MHA acid.

* * * * *